US009330670B2

(12) United States Patent
Ho et al.

(10) Patent No.: US 9,330,670 B2
(45) Date of Patent: May 3, 2016

(54) COMPUTING DEVICE AND SIGNAL ENHANCEMENT METHOD

(71) Applicant: HON HAI PRECISION INDUSTRY CO., LTD., New Taipei (TW)

(72) Inventors: Ching-Wei Ho, New Taipei (TW); Mu-San Chung, New Taipei (TW); Chun-Hsien Lin, New Taipei (TW); Che-Yi Chu, New Taipei (TW); Chin-Yu Chen, New Taipei (TW); Min-Bing Shia, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 452 days.

(21) Appl. No.: 13/929,787

(22) Filed: Jun. 28, 2013

(65) Prior Publication Data

US 2014/0032225 A1 Jan. 30, 2014

(30) Foreign Application Priority Data

Jul. 27, 2012 (TW) ............................ 101127299 A

(51) Int. Cl.

*G06F 17/00* (2006.01)
*G10L 19/00* (2013.01)
*G10L 21/0364* (2013.01)
*G10L 19/26* (2013.01)
*G10L 21/10* (2013.01)

(52) U.S. Cl.

CPC ................ *G10L 19/00* (2013.01); *G10L 19/26* (2013.01); *G10L 21/0364* (2013.01); *G10L 21/10* (2013.01)

(58) Field of Classification Search

None

See application file for complete search history.

(56) References Cited

U.S. PATENT DOCUMENTS

| | | | | |
|---|---|---|---|---|
| 6,999,526 | B2 * | 2/2006 | Gerlach | H04L 27/30 375/316 |
| 2006/0120540 | A1 * | 6/2006 | Luo | H04R 25/407 381/98 |
| 2007/0055398 | A1 * | 3/2007 | Steinberg | G10L 25/48 700/94 |
| 2011/0003638 | A1 * | 1/2011 | Lee | G09B 15/00 463/35 |
| 2012/0134238 | A1 * | 5/2012 | Surprenant | H04S 1/007 367/137 |

OTHER PUBLICATIONS

Beck et al., "Finite-Precision Goertzel Filters Used for Signal Tone Detection", Jun. 2001, IEEE Transactions on Circuits and Systems—II: Analog and Digital Signal Processing, vol. 48, No. 6, p. 691-700.*

* cited by examiner

*Primary Examiner* — Fan Tsang
*Assistant Examiner* — David Siegel
(74) *Attorney, Agent, or Firm* — Novak Druce Connolly Bove + Quigg LLP

(57) ABSTRACT

A computing device provides a resonance algorithm to process digital signal data according to a principle of physical resonance. The resonance algorithm determines a division length n of digital signal data according to a frequency f1 of an audio signal to be detected and a sampling frequency f2, which is used for sampling the digital signal data by a coder. Furthermore, the resonance algorithm divides the digital signal data into a serial of data segments by the division length n, and obtains enhanced digital signal data by accumulating a number m of the data segments.

16 Claims, 7 Drawing Sheets

| A1 | B1 | C1 | D1 | E1 | F1 | G1 | H1 | I1 |
|---|---|---|---|---|---|---|---|---|
| | 60× | % | 120× | % | 240× | % | 480× | % |
| 250 | 35280 | 100 | 70560 | 100 | 141120 | 100 | 282240 | 100 |
| 250.1 | 35280 | 100 | 70048 | 99.27438 | 137152 | 97.18821 | 262128 | 92.87415 |
| 250.2 | 35091 | 99.46429 | 68618 | 97.24773 | 131024 | 92.8458 | 215425 | 76.32688 |
| 250.3 | 34672 | 98.27664 | 67313 | 95.39824 | 120664 | 85.50454 | 149303 | 52.89931 |
| 250.4 | 34298 | 97.21655 | 65552 | 92.90249 | 107767 | 76.3655 | 76955 | 27.2658 |
| 250.5 | 34146 | 96.78571 | 63241 | 89.62727 | 91907 | 65.12684 | 11649 | 4.127338 |

FIG. 2

| A2 | B2 | C2 | D2 | E2 | F2 | G2 | H2 | I2 |
|---|---|---|---|---|---|---|---|---|
| | 60× | % | 120× | % | 240× | % | 480× | % |
| 50 | 35280 | 100 | 70560 | 100 | 141120 | 100 | 282240 | 100 |
| 50.1 | 34144 | 96.78005 | 63216 | 89.59184 | 91908 | 65.12755 | 11812 | 4.185091 |
| 50.2 | 31648 | 89.70522 | 45994 | 65.18424 | 5916 | 4.192177 | 11604 | 4.111395 |
| 50.3 | 27836 | 78.90023 | 23742 | 33.64796 | 30164 | 21.37472 | 11420 | 4.046202 |
| 50.4 | 22974 | 65.11905 | 2946 | 4.17517 | 5804 | 4.112812 | 11182 | 3.961876 |
| 50.5 | 17564 | 49.78458 | 10884 | 15.42517 | 17516 | 12.41213 | 10896 | 3.860544 |

FIG. 3

COMPUTING DEVICE AND SIGNAL ENHANCEMENT METHOD

BACKGROUND

1. Technical Field

Embodiments of the present disclosure relate to signal processing technology, and more particularly to a computing device and a method of enhancing signals.

2. Description of Related Art

Fourier transformation is widely used in speech recognition for identifying a signal with a specified frequency from mixed signals with different frequencies. However, Fourier transformation involves a large number of computations and thus occupies much memory space of a computing device. Thus, there is room for improvement.

BRIEF DESCRIPTION OF THE DRAWINGS

FIG. 2 illustrates amplitude variations of audio signal data that contains six different frequencies after being processed by the simulated resonance unit shown in FIG. 1, and FIG. 3 illustrates amplitude variations of audio signal data that contain another six different frequencies after being processed by the simulated resonance unit shown in FIG. 1.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
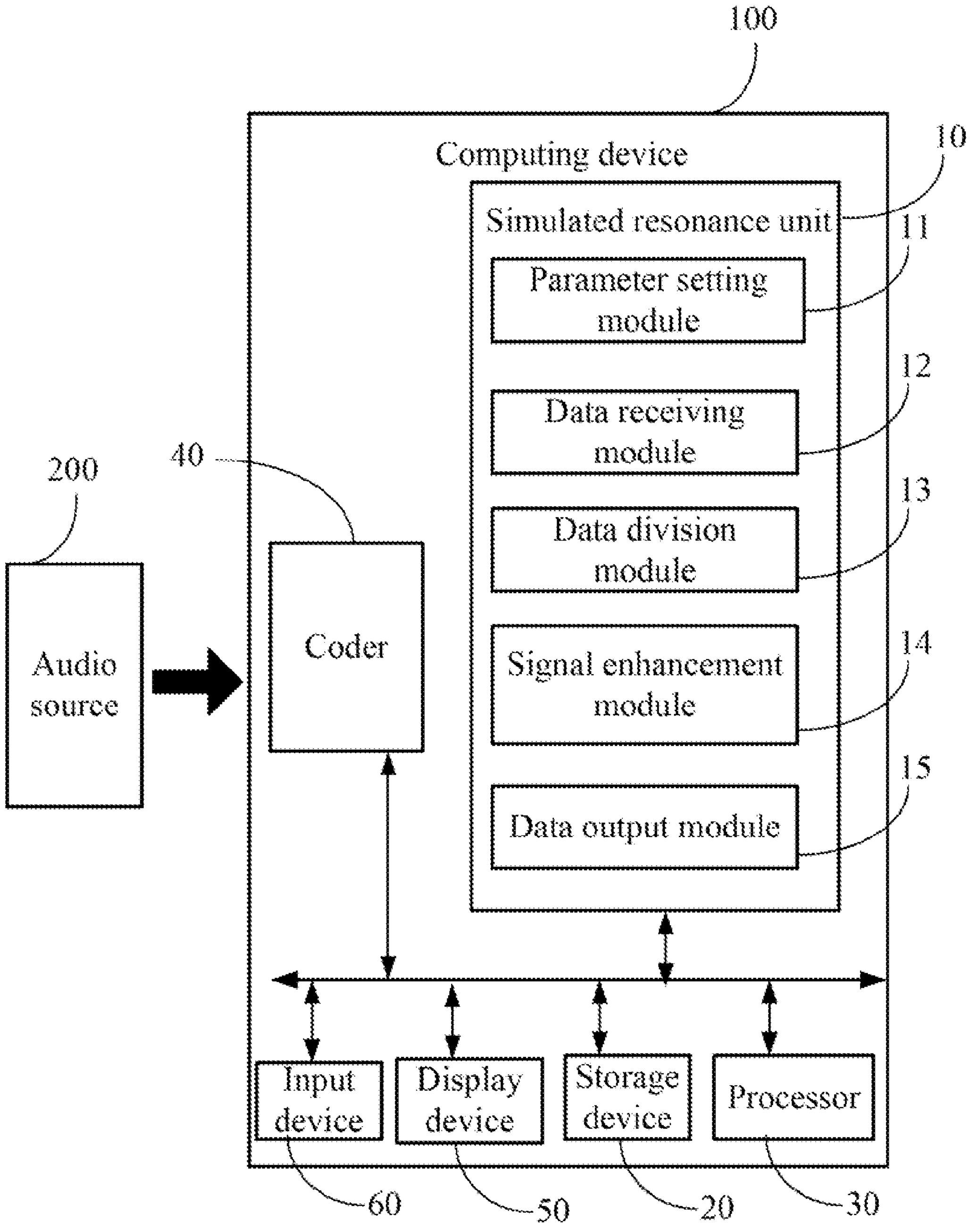
FIG. 1 is a block diagram of one embodiment of function modules of a computing device including a simulated resonance unit.

FIG. 1 is a block diagram of one embodiment of function modules of a signal computing device 100. In one embodiment, the signal computing device 100 includes a simulated resonance unit 10, a storage device 20, a processor 30, a coder 40, a display device 50, and an input device 60. The coder 40 receives analog signal data of audio signals output by an audio source 200, and converts the analog signal data into digital signal data using an audio coding method. The audio source 200 may be a person or an object (e.g., a speaker) that is capable of outputs analog audio signals. Depending on the embodiment, the computing device 100 may be a network camera, a portable computer, or a digital camera, or any other computing device that has audio data processing ability.

The simulated resonance unit 10 provides a resonance algorithm to process the digital signal data according to a principle of physical resonance. In physics, resonance is the tendency of a system to oscillate with greater amplitude at some frequencies than at others. That is, when audio signals with different frequencies pass through a resonance tube, an amplitude of an audio signal, which has the same frequency with the resonance tube, will be increased many more times than amplitudes of other audio signals, which have different frequencies with the frequency of the resonance tube. In one embodiment, a process of determining a division length n used to divide the digital signal data, divide the digital signal data into a serial of data segments by the division length n, and accumulate the data segments to obtain enhanced signal data is called as the "resonance algorithm." The division length n may be regarded as a length of a "simulated resonance", and a frequency f1 of an audio signal to be detected may be regarded as a frequency of the "simulated resonance". Utilizing the resonance algorithm, the audio signal with a specified frequency can be enhanced and be identified from other audio signals.

In one embodiment, as shown in FIG. 1, the simulated resonance unit 10 includes a parameter setting module 11, a data receiving module 12, a data division module 13, a signal enhancement module 14, and a data output module 15. The modules 11-15 include computerized code in the form of one or more programs that are stored in the storage device 20. The storage device 20 is a dedicated memory, such as an EPROM, a hard disk driver (HDD), or flash memory. The computerized code includes instructions that are executed by the processor 30, to provide aforementioned functions of the simulated resonance unit 10. The storage device 20 further stores the digital signal data before being processed by the simulated resonance unit 10, and the digital signal data after being processed by the simulated resonance unit 10.

The parameter setting module 11 receives the frequency f1 of the audio signal to be detected and an enhancement times m for enhancing the audio signal. The frequency f1 and the enhancement times m are input by a user via the input device 60, such as a keyboard. It is noted that the audio source 200 may output one or more audio signals with the same or different frequencies. For example, the audio signal desired to be detected may be a fire alarm with a frequency that equals 250 Hz (i.e., f1=250 Hz), and an amplitude that equals 588, and the enhancement times of the audio signal may be set as 480, which indicates to increase the amplitude of the audio signal by 480 times.

The data receiving module 12 receives digital signal data sent by the coder 40. In one embodiment, the coder 40 uses an audio coding method to convert analog signal data of the one or more audio signals, which are output by the audio source 200, into the digital signal data. For example, the audio coding method may be U Law or V Law. Using U Law or V Law, the analog signals output by the audio source 200 are sampled 8000 times per second, which indicates 8000 sample points are determined in the analog signals. Each sample point corresponds to a digital value of 16 bits, and U Law or V Law further codes each 16 bits to be 8 bit (i.e., one byte) when transferring data streaming. In other words, a sampling frequency for sampling the digital signal data by U Law or V Law is 8000 Hz.

The data division module 13 determines the division length n of the digital signal data according to the frequency f1 of the audio signal and the sampling frequency f2 of the digital signal data. In one embodiment, a formula n=f2/f1 is implemented. For one example, as mentioned above, f2=8000 Hz, f1=250 Hz, then n=f2/f1=8000 Hz/250 Hz=(8000 sample points/1 second)/(1 second/400)=32 sample points. Each sample point corresponds to a digital value of 16 bits (i.e., two bytes), so n=32 sample points×(two bytes per each sample point) =64 bytes.

The signal enhancement module 14 divides the digital signal data into the serial of data segments by the division length n, and obtains enhanced digital signal data by accumulating the number m of data segments, where a length of each data segment equals the division length n. For one example, the digital signal data includes data in relation to six audio signals that have the same amplitude 588, and six different frequencies such as 250 Hz, 250.1 Hz, 250.2 Hz, 250.3 Hz, 250.4 Hz, and 250.5 Hz, where the audio signal with the frequency 250 Hz is the fire alarm to be detected. As mentioned above, f2=8000 Hz, f1=250 Hz, then n=64 bytes. FIG. 2 shows variation of amplitudes of the six audio signals on condition that m respectively equals 60, 120, 240, and 480.

As shown in FIG. 2, a column "A1" represents the frequencies (e.g., 250 Hz, 250.1 Hz, 250.2 Hz, 250.3 Hz, 250.4 Hz, 250.5 Hz) of the six audio signals, columns "B1," "D1," "F1," and "H1" represent different values (e.g., 60, 120, 240, and 480) of m, columns "C1," "E1," "G1," "I1" represent variation degrees of the amplitudes of the six audio signals compared to amplitude variation of the audio signal with the frequency 250 Hz. As seen from FIG. 2, when m=480, the amplitude of the audio signal with the frequency 250 Hz is increased to be 282240, that is, the amplitude has been increased by 282240/588=480 times. The amplitude of the audio signal with the frequency 250.5 Hz is increased to be 11649, that is, the amplitude has been increased by 11649/588=19.81 times. A variation degree of amplitudes of two audio signals with the frequencies 250.5 Hz and 250 Hz is 19.81/480=4.1%. It can be seen that the amplitude of the audio signal that has the same frequency 250 Hz with the "simulated resonance" is increased much more times than audio signals with other frequencies.

FIG. 3 illustrates another example to show variation of amplitudes of another six audio signals on condition that m respectively equals 60, 120, 240, and 480. In this example, the digital signal data includes data in relation to six audio signals that have the same amplitude 588, and six different frequencies 50 Hz, 50.1 Hz, 50.2 Hz, 50.3 Hz, 50.4 Hz, and 50.5 Hz, where the audio signal with the frequency 50 Hz is the signal to be detected. On condition that U Law is implemented, the division length is computed as follows: f2/f1=(8000 sample points/1 second)/(1 second/50)=160 sample points=320 bytes. As seen from FIG. 3, utilizing the "resonance algorithm," when m=480, the variation degree of the audio signal with the frequency of 50 Hz is much more than the variation degree of other five audio signals. As seen from FIG. 2 and FIG. 3, utilizing the "resonance algorithm," when m is great enough, the audio signal to be detected is enhanced much more than other audio signals contained by the audio signal data, so that enhanced signal data approaches to the audio signal to be detected. In such a way, the audio signal to be detected can be distinguished from other audio signals.

The data output module 15 outputs the enhanced signal data to the display device 50, and regarded the enhanced signal data as data of the audio signal to be detected, which has been enhanced by m times.

Figure 4:
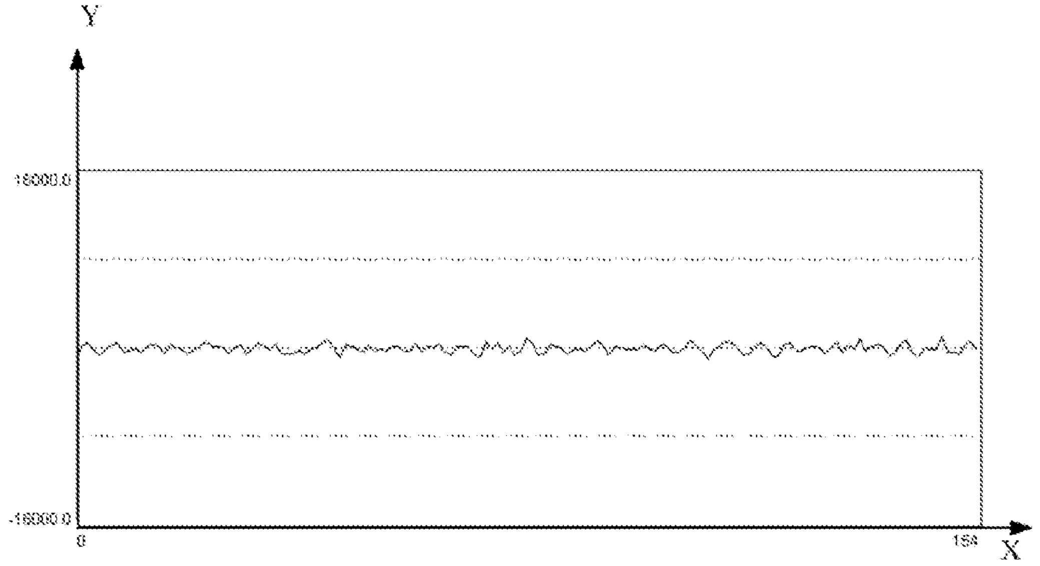
FIG. 4 illustrates an original wave of digital signal data that includes more than one signal with different frequencies.
Figure 5:
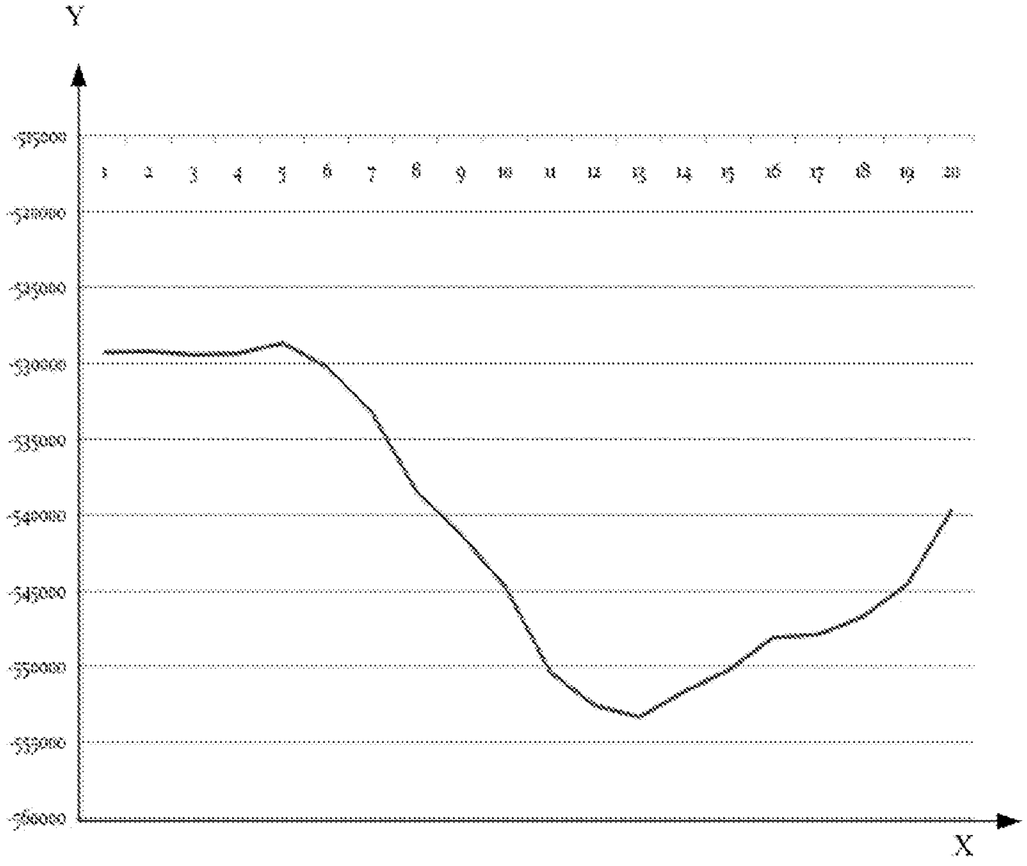
FIG. 5 illustrates a processed result of compressed data streaming corresponding to the original wave in FIG. 4, by using the simulated resonance unit shown in FIG. 1.
Figure 6:
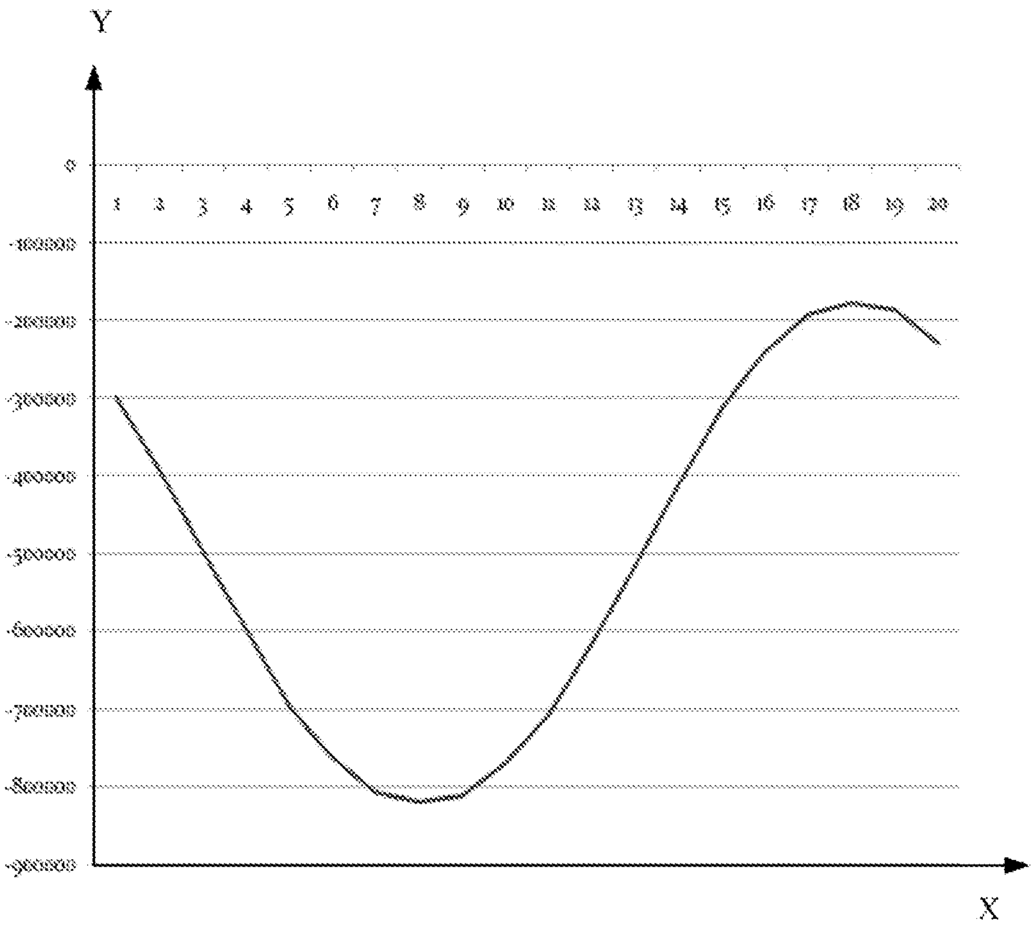
FIG. 6 illustrates a result of a processed result of decompressed data streaming obtained from the compressed data streaming of FIG. 5, by using the simulated resonance unit shown in FIG. 1.

FIG. 4 shows an original wave of digital signals converted from analog signals sent out by a network camera, where the analog signals include an audio signal with a frequency 400 Hz and other audio signals with other frequencies. FIG. 5 illustrates a processed result of compressed data streaming corresponding to the original wave in FIG. 4. As mentioned above, U Law or V Law codes each 16 bits to be 8 bit (i.e., one byte) when transferring data streaming, so one byte in the compressed data streaming in fact represents two bytes. FIG. 6 illustrates a result of a processed result of decompressed data streaming obtained from the compressed data streaming of FIG. 5, where the compressed data streaming sent out by the network camera is decompressed (i.e., revering each one byte to be two bytes) before using the resonance algorithm.

Figure 7:
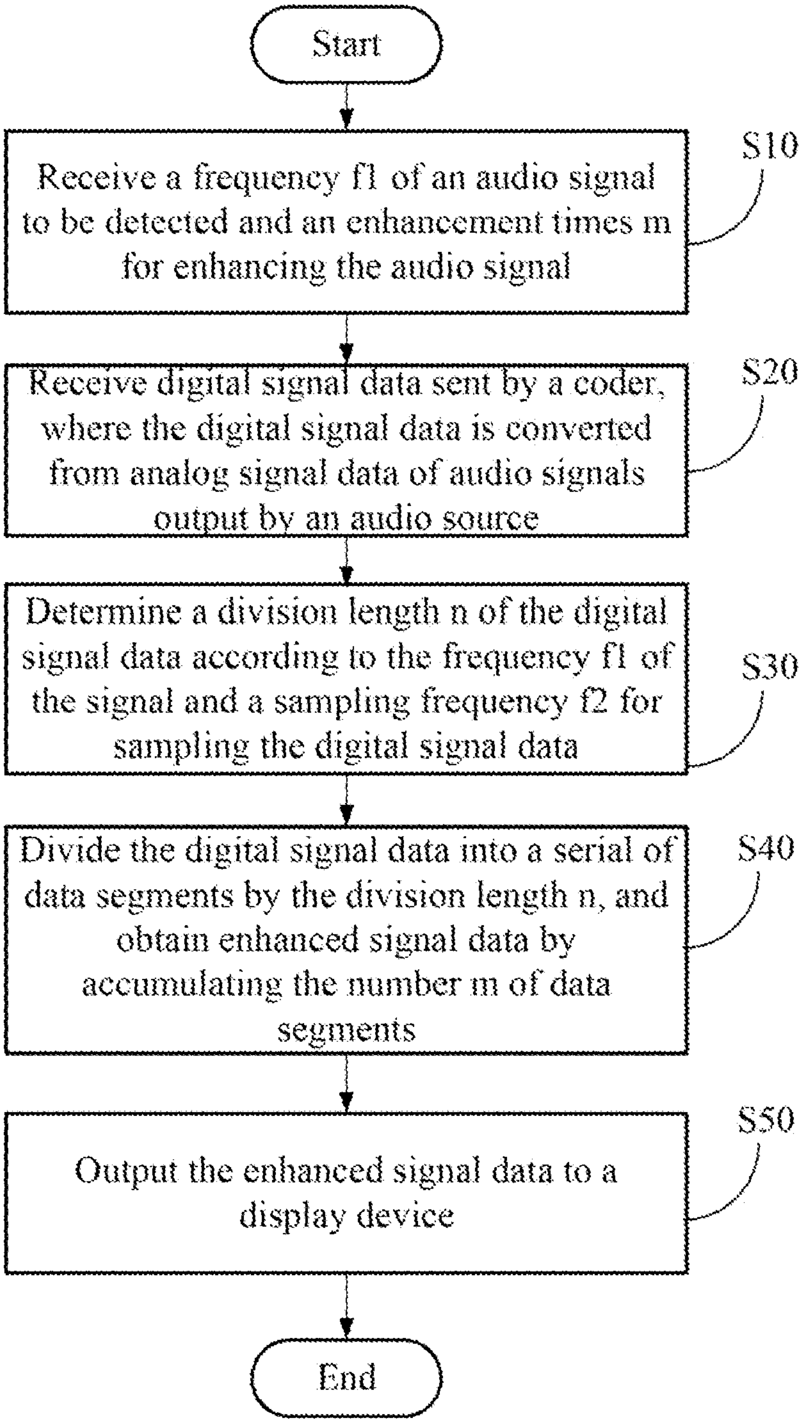
FIG. 7 is a flowchart of one embodiment of a signal enhancement method.

FIG. 7 is a flowchart of one embodiment of a signal enhancement method. Depending on the embodiment, additional steps may be added, others removed, and the ordering of the steps may be changed. In one embodiment, a process of determining a division length n of digital signal data, dividing the digital signal data into a serial of data segments by the division length n, and accumulating the data segments is called as a "resonance algorithm." The division length n may be regarded as a length of a "simulated resonance", and a frequency f1 of an audio signal to be detected is regarded as a frequency of the "simulated resonance."

In step S10, the parameter setting module 11 receives the frequency f1 of the audio signal to be detected and an enhancement times m for enhancing the audio signal. In one embodiment, the audio source 200 outputs two or more audio signals with different frequencies, and the audio signal with the frequency f1 is the audio signal desired to be detected. The frequency f1 is the audio signal desired to be detected is regarded as the frequency of the simulated resonance. For example, the audio signal desired to be detected may be a fire alarm with a frequency that equals 250 Hz (i.e., f1=250 Hz), and an amplitude that equals 588, and the enhancement times of the audio signal may be set as 480, which indicates to increase the amplitude of the audio signal by 480 times by using the "resonance algorithm."

In step S20, the data receiving module 12 receives digital signal data sent by the coder 40, which is converted from the analog signal data of the two or more audio signals. In one embodiment, the coder 40 uses an audio coding method to convert the analog signal data of the two or more audio signals, output by the audio source 200, into the digital signal data. For example, the audio coding method may be U Law or V Law. Using U Law or V Law, the analog signals output by the audio source 200 are sampled 8000 times per second, which indicates 8000 sample points are determined in the analog signals. Each sample point corresponds to a digital value of 16 bits, and U Law or V Law further codes each 16 bits to be 8 bit (i.e., one byte) when transferring data streaming of the digital signal data. In other words, a sampling frequency of the digital signal data by U Law or V Law is 8000 Hz.

In step S30, the data division module 13 determines a division length n of the digital signal data according to the frequency f1 of the audio signal and the sampling frequency f2 for sampling the digital signal data by the coder 40. In one embodiment, a formula n=f2/f1 is implemented. For one example, as mentioned above, f2=8000 Hz, f1=250 Hz, then n=f2/f1=8000 Hz/250 Hz=(8000 sample points/1 second)/(1 second/400)=32 sample points. Each sample point corresponds to a digital value of 16 bits (i.e., two bytes), so n=32 sample points×(two bytes per each sample point)=64 bytes.

In step S40, the signal enhancement module 14 divides the digital signal data into the serial of data segments by the division length n, and obtains enhanced digital signal data by accumulating a number m of data segments, where a length of each data segment equals the division length n. For one example, the digital signal data includes data in relation to six audio signals that have the same amplitude 588, and six different frequencies such as 250 Hz, 250.1 Hz, 250.2 Hz, 250.3 Hz, 250.4 Hz, and 250.5 Hz, where the audio signal with the frequency 250 Hz is the fire alarm to be detected. As mentioned above, f2=8000 Hz, f1=250 Hz, then n=64 bytes. By dividing the digital signal data by the division length 64 bytes, a plurality of data segments is obtained, and each data segment has a length of 64 bytes. If m=480, signal enhancement module 14 accumulates 480 data segments to obtain the enhanced digital signal data. For example, FIG. 3 shows variation of amplitudes of the six audio signals on condition that m respectively equals 60, 120, 240, and 480. As seen from FIG. 3, the amplitude of the audio signal that has the same frequency 250 Hz with the "simulated resonance" is increased much more times than audio signals with other frequencies.

In step S50, the data output module 15 outputs the enhanced signal data to the display device 50, and regarded the enhanced signal data as data of the audio signal to be detected, which has been enhanced by m times.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A signal enhancement method being executed by a processor of a computing device, the method comprising:

receiving a frequency f1 of an audio signal and an enhancement times m used for enhancing the audio signal;

receiving digital signal data converted from analog signal data by a coder;

determining a division length n of the digital signal data according to the frequency f1 of the audio signal and a sampling frequency f2 for sampling the digital signal data used by the coder;

dividing the digital signal data into a serial of data segments by the division length n, and obtaining enhanced digital signal data by accumulating a number m of data segments; and outputting the enhanced digital signal data to a display device, and regarding the enhanced digital signal data as data of the audio signal, which has been enhanced by m times.

2. The method as claimed in claim 1, wherein the digital signal data refers to one or more signals with a same amplitude.

3. The method as claimed in claim 1, wherein the division length n is determined using a formula n=f2/f1.

4. The method as claimed in claim 1, wherein the digital signal data are converted from analog signal data output by an audio source using an audio coding method.

5. The method as claimed in claim 4, wherein the audio coding method is U Law or V Law.

6. The method as claimed in claim 1, wherein the frequency f1 of the enhancement times m are input from an input device.

7. A computing device, comprising:

at least one processor; and a storage device storing one or more programs, when executed by the at least one processor, cause the at least one processor to perform operations of:

receiving a frequency f1 of an audio signal and an enhancement times m for enhancing the audio signal;

receiving digital signal data converted from analog signal data by a coder;

determining a division length n of the digital signal data according to the frequency f1 of the audio signal and a sampling frequency f2 for sampling the digital signal data used by the coder;

dividing the digital signal data into a serial of data segments by the division length n, and obtaining enhanced digital signal data by accumulating a number m of data segments; and outputting the enhanced digital signal data to a display device, and regarding the enhanced digital signal data as data of the audio signal, which has been enhanced by m times.

8. The computing device as claimed in claim 7, wherein the digital signal data refers to one or more signals with a same amplitude.

9. The computing device as claimed in claim 7, wherein the division length n is determined using a formula n=f2/f1.

10. The computing device as claimed in claim 7, wherein the digital signal data are converted from analog signal data output by an audio source using an audio coding method.

11. The method as claimed in claim 10, wherein the audio coding method is U Law or V Law.

12. A non-transitory computer-readable medium having stored thereon instructions that, when executed by at least one processor of a computing device, cause the at least one processor to perform a method comprising:

receiving a frequency f1 of an audio signal to be detected and an enhancement times m for enhancing the audio signal;

receiving digital signal data converted from analog signal data by a coder;

determining a division length n of the digital signal data according to the frequency f1 of the audio signal and a sampling frequency f2 for sampling the digital signal data used by the coder;

dividing the digital signal data into a serial of data segments by the division length n, and obtaining enhanced digital signal data by accumulating a number m of data segments; and outputting the enhanced digital signal data to a display device, and regarding the enhanced digital signal data as data of the audio signal, which has been enhanced by m times.

13. The medium as claimed in claim 12, wherein the digital signal data refers to one or more signals with the same amplitude.

14. The medium as claimed in claim 12, wherein the division length n is determined using a formula n=f2/f1.

15. The medium as claimed in claim 12, wherein the digital signal data are converted from analog signal data output by an audio source using an audio coding method.

16. The medium as claimed in claim 15, wherein the audio coding method is U Law or V Law.

* * * * *